United States Patent
Lei et al.

(10) Patent No.: US 12,245,285 B2
(45) Date of Patent: Mar. 4, 2025

(54) ENHANCED CONFIGURATION FOR PHYSICAL RANDOM ACCESS CHANNEL MASK AND RANDOM ACCESS RESPONSE WINDOW

(71) Applicant: QUALCOMM Incorporated, San Diego, CA (US)

(72) Inventors: Jing Lei, San Diego, CA (US); Peter Pui Lok Ang, San Diego, CA (US); Linhai He, San Diego, CA (US); Ruiming Zheng, Beijing (CN); Huilin Xu, Temecula, CA (US); Wanshi Chen, San Diego, CA (US); Qiaoyu Li, Beijing (CN); Chao Wei, Beijing (CN); Krishna Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/754,846

(22) PCT Filed: Nov. 7, 2019

(86) PCT No.: PCT/CN2019/116195
§ 371 (c)(1),
(2) Date: Apr. 13, 2022

(87) PCT Pub. No.: WO2021/087850
PCT Pub. Date: May 14, 2021

(65) Prior Publication Data
US 2023/0164844 A1    May 25, 2023

(51) Int. Cl.
*H04W 74/0833*    (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS

| 11,678,246 | B2* | 6/2023 | Park | H04W 74/0833 |
| | | | | 455/436 |
| 2017/0013391 | A1* | 1/2017 | Rico Alvarino | H04L 5/0051 |

(Continued)

FOREIGN PATENT DOCUMENTS

| CN | 102480794 A | 5/2012 |
| CN | 104186010 A | 12/2014 |

(Continued)

OTHER PUBLICATIONS

International Search Report and Written Opinion—PCT/CN2019/116195—ISA/EPO—Jul. 29, 2020.

(Continued)

*Primary Examiner* — Anh Vu H Ly
(74) *Attorney, Agent, or Firm* — Harrity & Harrity, LLP

(57) ABSTRACT

Various aspects of the present disclosure generally relate to wireless communication. In some aspects, a base station may transmit, and a user equipment (UE) may receive, configuration information related to a random access procedure. For example, in some aspects, the configuration information may include a physical random access channel mask configuration based at least in part on a random access occasion density in a time and frequency domain in a cell served by the base station, a random access response configuration based at least in part on an indication transmitted from the UE to the base station, and/or the like. Accordingly, the UE may perform the random access procedure based at least in part on the configuration information, which may be (Continued)

indicated to the UE in system information, radio resource control signaling, and/or the like. Numerous other aspects are provided.

31 Claims, 10 Drawing Sheets

(56) References Cited

U.S. PATENT DOCUMENTS

| | | | |
|---|---|---|---|
| 2018/0368179 A1 | 12/2018 | He et al. | |
| 2019/0182870 A1* | 6/2019 | Shih | H04W 16/32 |
| 2019/0208550 A1 | 7/2019 | Ko et al. | |
| 2019/0215220 A1* | 7/2019 | Islam | H04W 74/0833 |
| 2020/0229157 A1* | 7/2020 | Rastegardoost | H04L 5/0098 |
| 2020/0351955 A1* | 11/2020 | Jeon | H04W 80/02 |
| 2022/0191936 A1* | 6/2022 | Shin | H04W 74/0833 |

FOREIGN PATENT DOCUMENTS

| | | |
|---|---|---|
| CN | 106941730 A | 7/2017 |
| EP | 3439422 A1 | 2/2019 |
| WO | 2018170880 A1 | 9/2018 |
| WO | WO-2019099443 A1 | 5/2019 |
| WO | 2019139730 A1 | 7/2019 |

OTHER PUBLICATIONS

Huawei, et al., "Remaining Details of RACH Procedures", 3GPP TSG RAN WG1 Meeting #92, R1-1801331, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, 5 Pages, Feb. 17, 2018 (Feb. 17, 2018), XP051397495, section 3.
Supplementary European Search Report—EP19951932—Search Authority—The Hague—Jun. 21, 2023.

* cited by examiner

ENHANCED CONFIGURATION FOR PHYSICAL RANDOM ACCESS CHANNEL MASK AND RANDOM ACCESS RESPONSE WINDOW

CROSS-REFERENCE TO RELATED APPLICATION

This application is a 371 national stage of Patent Cooperation Treaty (PCT) Application No. PCT/CN2019/116195 filed on Nov. 7, 2019, entitled "ENHANCED CONFIGURATION FOR PHYSICAL RANDOM ACCESS CHANNEL MASK AND RANDOM ACCESS RESPONSE WINDOW," which is hereby expressly incorporated by reference herein.

FIELD OF THE DISCLOSURE

Aspects of the present disclosure generally relate to wireless communication and to techniques and apparatuses for providing an enhanced configuration for a physical random access channel mask and random access response window.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving, from a base station, system information or radio resource control signaling that includes configuration information related to a random access procedure, wherein the configuration information includes one or more of a physical random access channel (PRACH) mask configuration that is based at least in part on a random access occasion (RO) density in a time and frequency domain in a cell served by the base station, or a random access response (RAR) configuration that is based at least in part on an indication transmitted from the UE to the base station; and performing the random access procedure based at least in part on the configuration information.

In some aspects, a method of wireless communication, performed by a base station, may include: determining configuration information related to a random access procedure, wherein the configuration information includes one or more of a PRACH mask configuration that is based at least in part on an RO density in a time and frequency domain in a cell served by the base station, or an RAR configuration that is based at least in part on an indication received from a UE; and transmitting, to the UE, system information or radio resource control signaling that includes the configuration information for use in performing the random access procedure.

In some aspects, a UE for wireless communication may include a memory and one or more processors operatively coupled to the memory. The memory and the one or more processors may be configured to: receive, from a base station, system information or radio resource control signaling that includes configuration information related to a random access procedure, wherein the configuration information includes one or more of a PRACH mask configuration that is based at least in part on an RO density in a time and frequency domain in a cell served by the base station, or an RAR configuration that is based at least in part on an indication transmitted from the UE to the base station; and perform the random access procedure based at least in part on the configuration information.

In some aspects, a base station for wireless communication may include a memory and one or more processors operatively coupled to the memory. The memory and the one or more processors may be configured to: determine configuration information related to a random access procedure, wherein the configuration information includes one or more of a PRACH mask configuration that is based at least in part on an RO density in a time and frequency domain in a cell served by the base station, or an RAR configuration that is based at least in part on an indication received from a UE; and transmit, to the UE, system information or radio resource control signaling that includes the configuration information for use in performing the random access procedure.

In some aspects, a non-transitory computer-readable medium may store one or more instructions for wireless communication. The one or more instructions, when executed by one or more processors of a UE, may cause the one or more processors to: receive, from a base station, system information or radio resource control signaling that includes configuration information related to a random access procedure, wherein the configuration information includes one or more of a PRACH mask configuration that is based at least in part on an RO density in a time and frequency domain in a cell served by the base station, or an RAR configuration that is based at least in part on an indication transmitted from the UE to the base station; and perform the random access procedure based at least in part on the configuration information.

In some aspects, a non-transitory computer-readable medium may store one or more instructions for wireless communication. The one or more instructions, when executed by one or more processors of a base station, may cause the one or more processors to: determine configuration information related to a random access procedure, wherein the configuration information includes one or more of a PRACH mask configuration that is based at least in part on an RO density in a time and frequency domain in a cell served by the base station, or an RAR configuration that is based at least in part on an indication received from a UE; and transmit, to the UE, system information or radio resource control signaling that includes the configuration information for use in performing the random access procedure.

In some aspects, an apparatus for wireless communication may include: means for receiving, from a base station, system information or radio resource control signaling that includes configuration information related to a random access procedure, wherein the configuration information includes one or more of a PRACH mask configuration that is based at least in part on an RO density in a time and frequency domain in a cell served by the base station, or an RAR configuration that is based at least in part on an indication transmitted from the apparatus to the base station; and means for performing the random access procedure based at least in part on the configuration information.

In some aspects, an apparatus for wireless communication may include: means for determining configuration information related to a random access procedure, wherein the configuration information includes one or more of a PRACH mask configuration that is based at least in part on an RO density in a time and frequency domain in a cell served by the apparatus, or an RAR configuration that is based at least in part on an indication received from a UE; and means for transmitting, to the UE, system information or radio resource control signaling that includes the configuration information for use in performing the random access procedure.

Aspects generally include a method, apparatus, system, computer program product, non-transitory computer-readable medium, UE, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
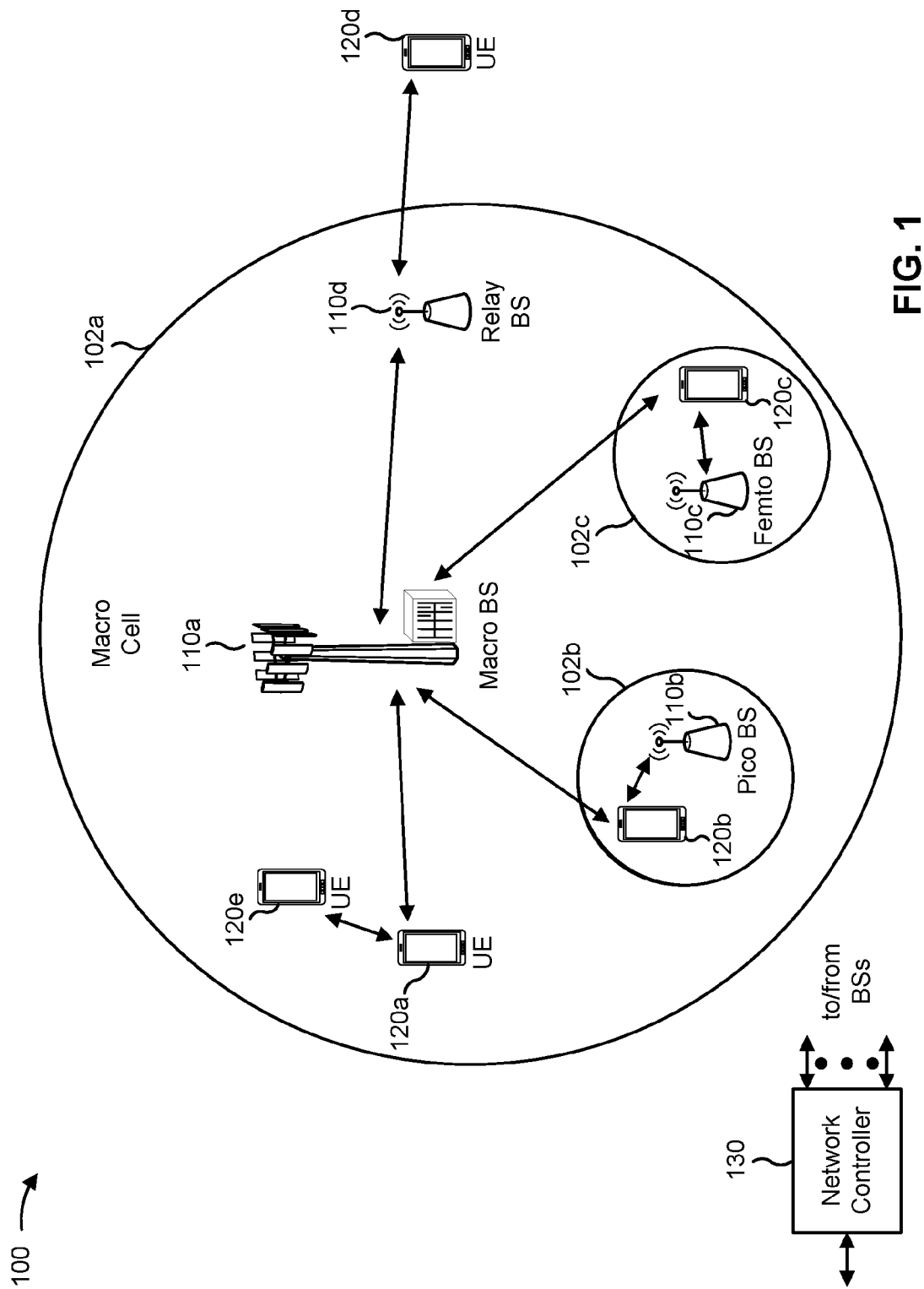
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
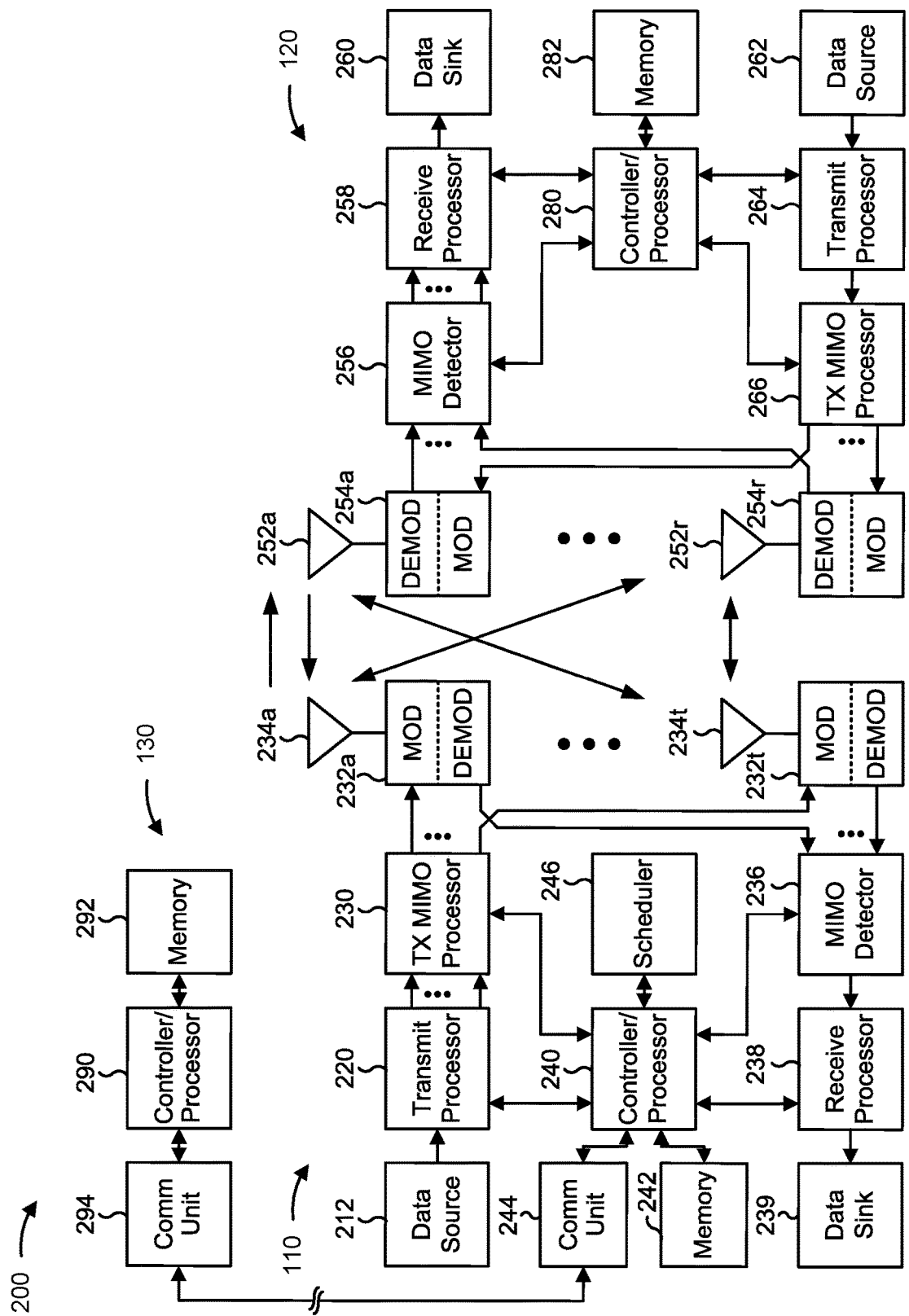
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques to provide an enhanced configuration for a physical random access channel (PRACH) mask, a random access response (RAR) window, and/or the like, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, UE 120 may include means for receiving, from base station 110, system information or radio resource control (RRC) signaling that includes configuration information related to a random access procedure, where the configuration information includes a PRACH mask configuration that is based at least in part on a random access occasion (RO) density in a time and frequency domain in a cell served by base station 110 and/or an RAR configuration that is based at least in part on an indication transmitted from the apparatus to the base station, means for performing the random access procedure based at least in part on the configuration information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining configuration information related to a random access procedure, where the configuration information includes a PRACH mask configuration that is based at least in part on a random access occasion density in a time and frequency domain in a cell served by the apparatus and/or an RAR configuration that is based at least in part on an indication received from UE 120, means for transmitting, to UE 120, system information or RRC signaling that includes the configuration information for use in performing the random access procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
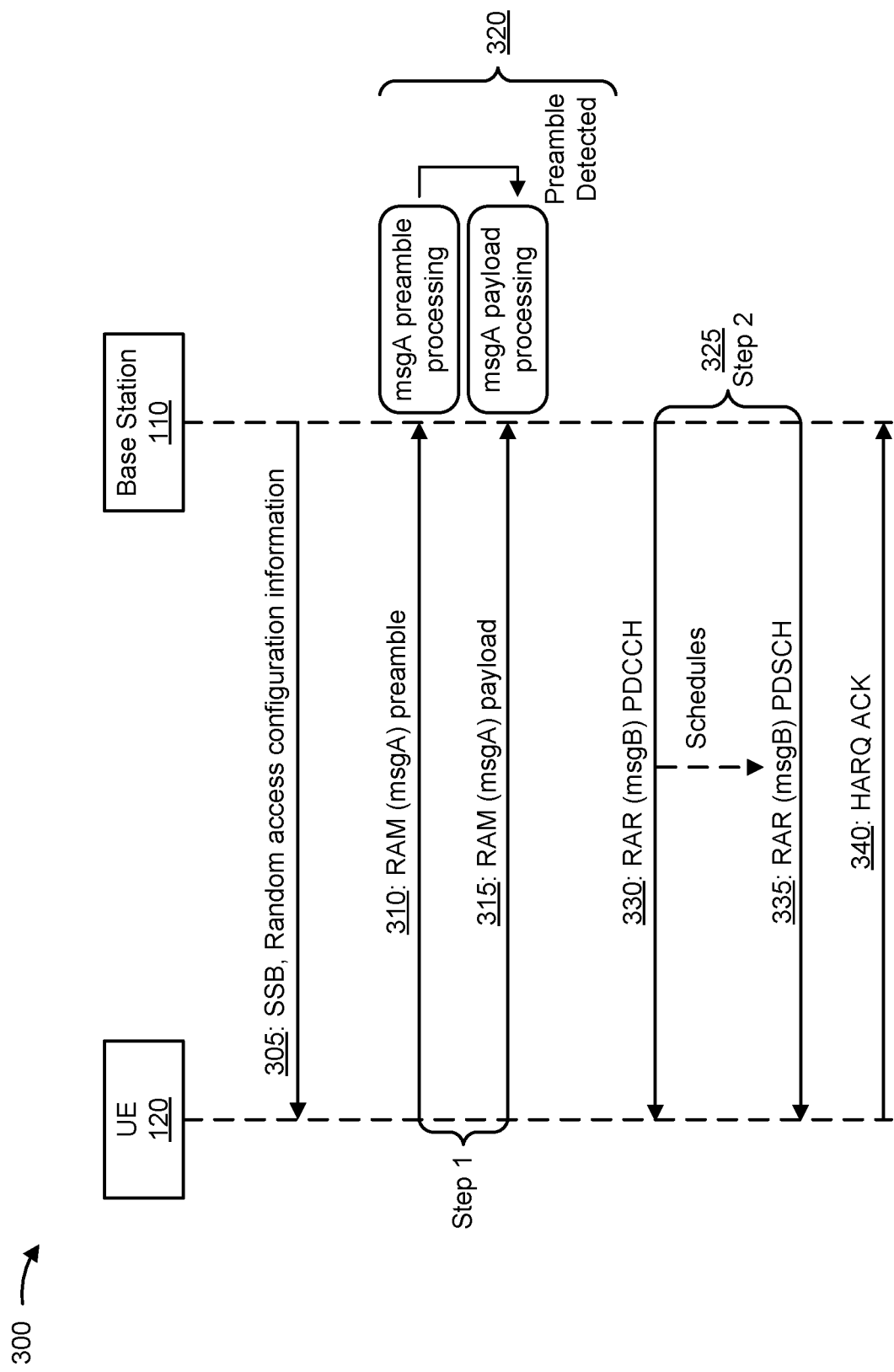
FIG. 3 is a diagram illustrating an example of a two-step random access procedure, in accordance with various aspects of the present disclosure.

FIG. 3 is a diagram illustrating an example 300 of a two-step random access procedure, in accordance with various aspects of the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB. Additionally, or alternatively, the random access configuration information may be transmitted in a radio resource control (RRC) message. The random access configuration information may include one or more parameters to be used in the two-step random access procedure, such as one or more parameters for transmitting a random access message (RAM), receiving a random access response (RAR) to the RAM, and/or the like.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, an initial message, and/or the like in a two-step random access procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 330, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
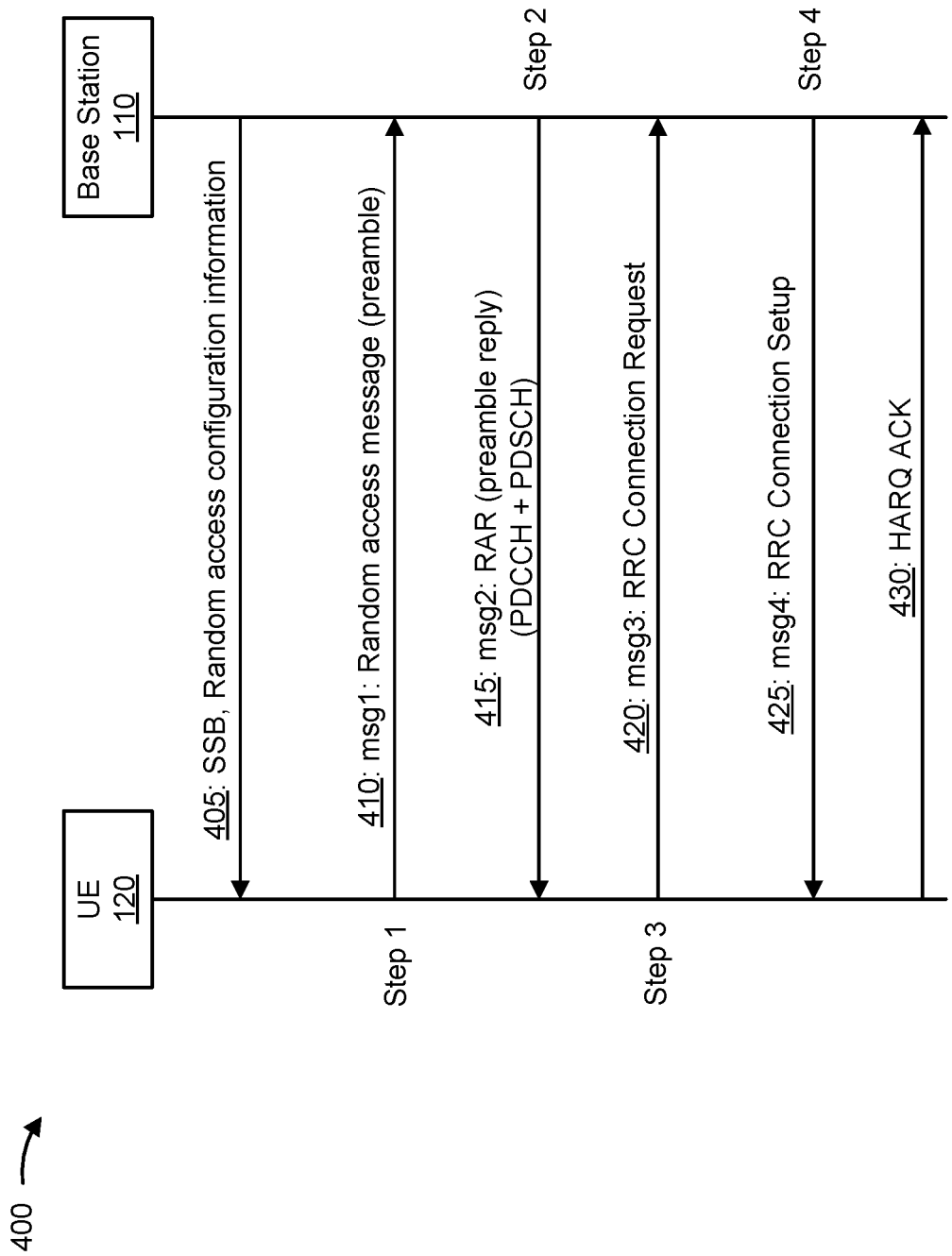
FIG. 4 is a diagram illustrating an example of a four-step random access procedure, in accordance with various aspects of the present disclosure.

FIG. 4 is a diagram illustrating an example of a four-step random access procedure, in accordance with various aspects of the present disclosure. As shown in FIG. 4, a base station 110 and a UE 120 may communicate with one another to perform the four-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs and/or the like) and/or an SSB. Additionally, or alternatively, the random access configuration information may be transmitted in an RRC message. The random access configuration information may include one or more parameters to be used in the random access procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, UCI, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

A random access procedure, such as the two-step random access procedure illustrated in FIG. 3 and/or the four-step random access procedure illustrated in FIG. 4, may be triggered by various events and/or may be used in various scenarios. For example, a random access procedure may be used for initial network access (e.g., from an RRC idle state), RRC connection re-establishment, indicating or obtaining on-demand system information, synchronous configuration, scheduling request failure, performing a handover, performing a beam failure recovery procedure, and/or the like. In some cases, these different random access use cases may be associated with different priorities. For example, when performing a two-step or four-step contention-based random access procedure, random access prioritization may be supported for handover scenarios, beam failure recovery scenarios, and/or the like. In such scenarios, a UE may indicate that a random access request is to be prioritized in an initial message of the random access procedure (e.g., in a demodulation reference signal (DMRS) associated with the msgA payload in a two-step random access procedure, in the preamble of msg1 in a four-step random access procedure, and/or the like). Furthermore, in some cases, different random access modes, such as two-step random access or four-step random access, may be used. For example, a UE may use the two-step random access procedure when low-latency is required, such as when performing a beam failure recovery procedure, communicating time-sensitive (e.g., ultra-reliable low-latency communication (URLLC)) traffic, and/or the like. Furthermore, different UEs 120 may have different capabilities for performing a random access procedure (e.g., some UEs may support only the four-step random access procedure).

As a result, there are different circumstances in which a UE may initiate a random access procedure, which may vary based on UE capabilities (e.g., supported bandwidths, power class, and/or the like), random access type (e.g., two-step versus four-step), random access priorities (e.g., for handover or beam failure recovery), and/or the like. Accordingly, to handle the varying circumstances in which UEs may initiate a random access procedure, a base station may configure up to a maximum of sixteen (16) different random access occasions (ROs), which generally refer to time and frequency resources that UEs can use to initiate a random access procedure. In some cases, the ROs that are configured in a cell served by a base station may be signaled to UEs in the cell via a PRACH mask index (e.g., in an ra-ssb-OccasionMaskIndex information element carried in RRC signaling). For example, the PRACH mask index may define one or more ROs (e.g., time and frequency resources) a UE is allowed to use to initiate a random access procedure. For example, the UE may be configured with a hard-coded table that defines a mapping between various PRACH mask indexes and allowed RO masking patterns (e.g., an RO masking pattern may cover all ROs, every even RO, every odd RO, every fourth RO, every RO in a first half of a system frame, every RO in a second half of a system frame, and/or the like). However, the PRACH mask index is generally indicated using a four-bit field that has a fixed bit width, which means that a network can configure at most sixteen distinctive RO masking patterns, which may provide insufficient range and/or granularity in cases where the UEs performing the random access procedure may have varying capabilities, perform different types of random access procedures, have different random access priorities, and/or the like.

Furthermore, another parameter that may be signaled to the UE to configure random access behavior is an RAR window configuration (e.g., in an rar-WindowLength information element, which may differ between the two-step random access procedure and the four-step random access procedure). For example, in a four-step RACH procedure, a starting point of the RAR window may be aligned with a first PDCCH symbol in an earliest search space configured for msg2, which is transmitted from the base station to the UE at least one symbol after the msg1 preamble transmission from the UE to the base station. In a two-step RACH procedure, the starting point of the RAR window may be aligned with a first PDCCH symbol in an earliest search space configured for msgB, which is transmitted at least one symbol after the msgA payload (e.g., PUSCH) transmission. In general, if the UE does not receive the RAR before the RAR window elapses, the UE may have to re-initiate the random access procedure. Accordingly, in some cases, the RAR window length may be extended (e.g., to longer than 10 ms) to reduce a probability that the RAR window elapses before the UE receives the RAR. However, this may result in UEs consuming more power due to the need to monitor all PDCCH occasions over the extended RAR window. Additionally, or alternatively, the RAR window length may be reduced (e.g., to serve low-latency use cases by allowing a retransmission to start earlier). However, reducing the RAR window length increases a computation burden at the base station.

Some techniques and apparatuses described herein relate to an enhanced configuration for a PRACH mask and RAR window to improve power efficiency, random access flexibility, and/or the like. In some aspects, a PRACH mask index may have a variable bit width that can be scaled according to a density of ROs. For example, the RO density or mapping cycles between an SSB and one or more ROs may be adapted to increase or decrease random access opportunities according to UE capabilities, random access types, random access priorities, and/or the like. Accordingly, in some aspects, the bit width of the PRACH mask index may be increased (e.g. to more than four bits) to provide a greater range and granularity of RO masking patterns that define allowed ROs in which UEs can initiate a random access procedure. Furthermore, in some aspects, RO bundling may be applied in order to group one or more ROs in which UEs can initiate a random access procedure. In this way, a number of RO masking patterns that are configured for an SSB may be adapted to provide ranges and granularities suitable for different combinations of UE capabilities, random access types, random access priorities, and/or the like. Additionally, or alternatively, in some aspects, an enhanced RAR window configuration may be provided to save UE power consumption, reduce latency, and/or the like. For example, some UEs may transmit a power saving request to a base station, which may then delay transmission of an RAR to the UEs for a configured time period after a start of the RAR window. In this way, the UEs may refrain from monitoring for the RAR transmission during the configured time period to save power. Furthermore, in some cases, other UEs may transmit a prioritized random access request, and the base station may transmit the RAR to such UEs during the configured time period during which the RAR is not transmitted to the UEs that provided the power saving request. In this way, an earlier portion of the RAR window can be used to transmit the RAR to prioritized UEs, which may reduce latency for such UEs, efficiently use available resources to transmit the RAR, and/or the like.

Figure 5A:
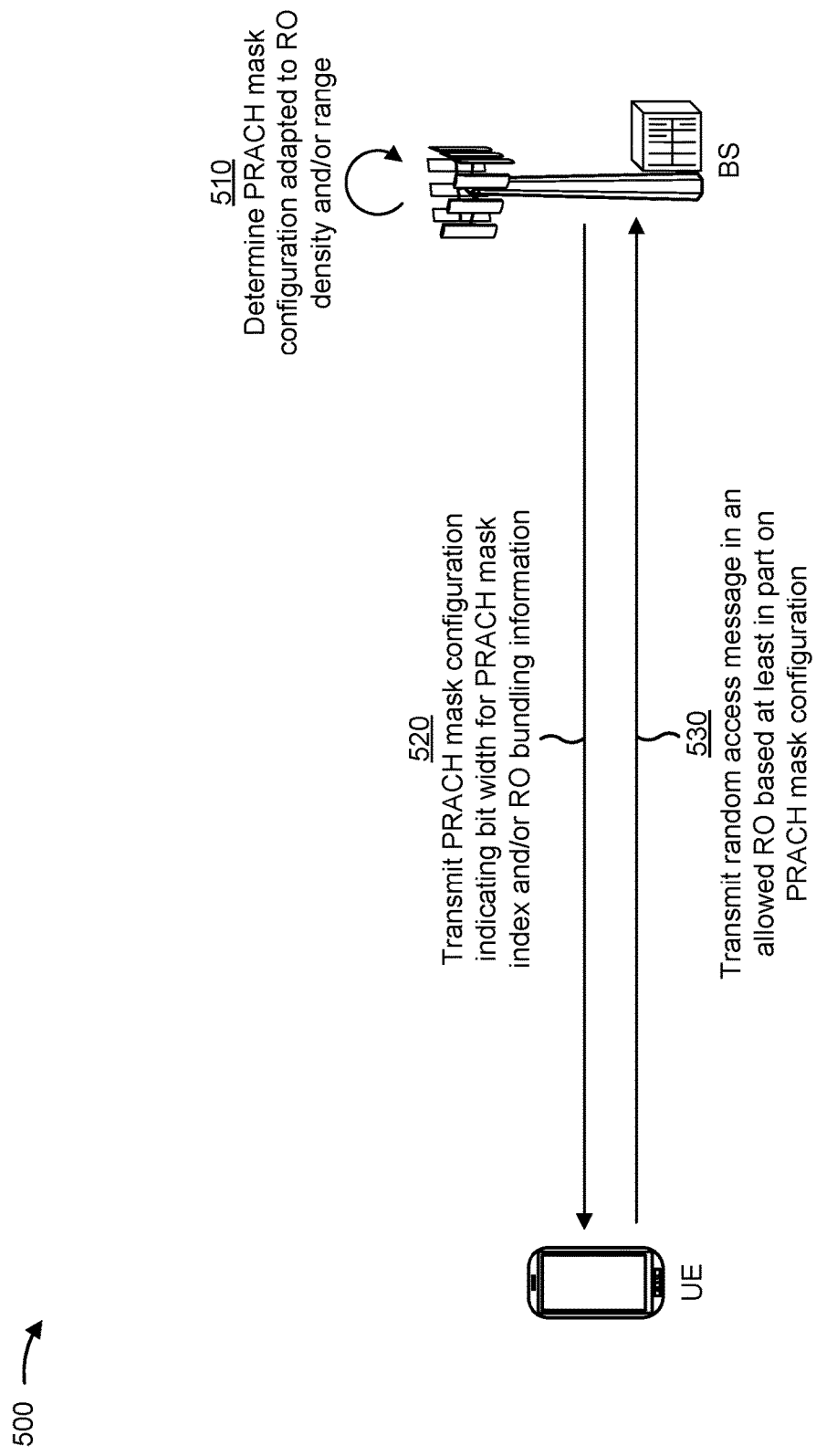
FIGS. 5A-5B are diagrams illustrating one or more examples providing an enhanced configuration for a physical random access channel (PRACH) mask, in accordance with various aspects of the present disclosure.
Figure 5B:
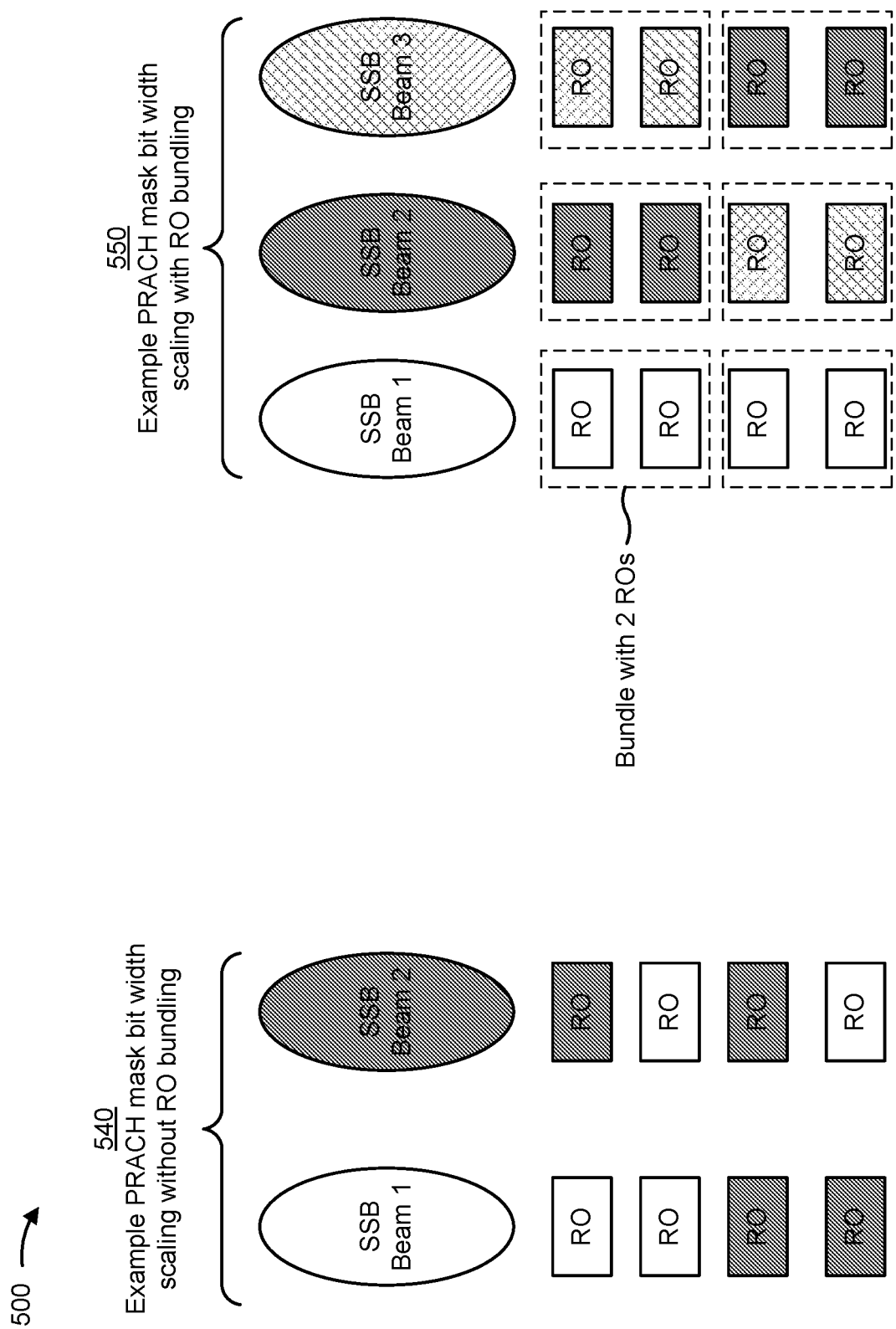

FIGS. 5A-5B are diagrams illustrating one or more examples 500 of providing an enhanced configuration for a PRACH mask, in accordance with various aspects of the present disclosure. As shown in FIG. 5A, a base station and a UE may communicate with one another to perform a random access procedure based at least in part on the enhanced configuration for the PRACH mask, which may be defined in a time and frequency domain, as described in further detail herein.

As shown in FIG. 5A, and by reference number 510, the base station may determine a PRACH mask configuration that is adapted to an RO density and/or RO range in a time and frequency domain. For example, in some aspects, the RO density in the time and frequency domain may be scaled, or mapping cycles between a beam associated with an SSB and a set of ROs can be otherwise adapted to increase and/or decrease random access opportunities for UEs having different capabilities, UEs performing different random access types, UEs having different priority classes, different quantities of UEs communicating with the base station, and/or the like. For example, to increase the RO density, the base station may configure one or more new ROs in the time domain, the frequency domain, and/or the like. Accordingly, if a number of configured ROs is increased, more RO masking patterns may be supported in order to define which RO(s) the UE is allowed to use to initiate the random access procedure (e.g., to avoid collisions based at least in part on capabilities of the UE, a priority class of the UE, a type of random access procedure the UE is performing, traffic conditions, and/or the like). In some cases, depending on the number of configured ROs, and therefore the number of RO masking patterns that can be supported, a fixed four-bit field for the PRACH mask index may be insufficient to cover the available RO masking patterns (e.g., when more than sixteen RO masking patterns are to be configured).

Accordingly, in some aspects, the PRACH mask configuration that is adapted to an RO density and/or RO range may include a variable bit width that can be scaled according to the RO density and/or range, where the bit width generally defines a range and granularity of the PRACH mask index. For example, if the PRACH mask index has a bit width of $L$, there will be $2^L$ distinct PRACH mask patterns. In some aspects, the bit width for the PRACH mask index may be increased (e.g., to 5 or 6 bits) to support more RO masking patterns (e.g., up to 32 patterns in the case of a five-bit PRACH mask index, up to 64 patterns in the case of a six-bit PRACH mask index, and/or the like). Furthermore, in some cases, the bit width may be scaled down to support fewer RO masking patterns (e.g., to 3 bits for a downlink-centric network, such as a broadcast network). Accordingly, in some aspects, the bit width of the PRACH mask index may generally be based at least in part on the density of ROs (e.g., the bit width may be increased in cases where there is a high RO density, decreased in cases where there is a low RO density, and/or the like). For example, the base station may determine the appropriate RO density based on UE capability information that is indicated to the base station when UEs register with the base station, statistical traffic analysis, capabilities reported by UEs operating in a connected mode, and/or the like.

Additionally, or alternatively, in some aspects, the PRACH mask configuration may include information related to RO bundling that may be applied for ROs that are consecutive in time and/or frequency and mapped to the same SSB beam. For example, when RO bundling is applied, the base station may configure a size of an RO bundle (e.g., a number of ROs that are grouped together in an RO bundle), a total number of RO bundles that are configured per SSB beam, and/or the like. In this way, an SSB to RO association can be defined for multiple ROs, which may increase efficiency, reduce SSB beamforming complexity, and/or the like.

As further shown in FIG. 5A, and by reference number 520, the base station may transmit, and the UE may receive, a signaling message (e.g., system information, an RRC message, and/or the like) that includes the PRACH mask configuration indicating the bit width for the PRACH mask index, RO bundling information, and/or the like for a specific bandwidth part. For example, in some aspects, the bit width of the PRACH mask index may be included in an information element corresponding to the PRACH mask to be configured (e.g., when the bit width of the PRACH mask to be configured differs from the default bit width indicated in an ra-ssb-OccasionMaskIndex parameter. In addition, the base station may indicate, to the UE, a value for the PRACH mask index, which may be mapped to a particular RO masking pattern. For example, in some aspects, multiple tables may be configured for PRACH mask indexes having different bit widths, and each table may define a mapping between different values for the PRACH mask index and different RO masking patterns. In this way, by signaling the bit width to the UE, the base station may inform the UE about which table to use, and the value for the PRACH mask index may be mapped to a particular RO masking pattern in the table associated with the indicated bit width for the PRACH mask index. Furthermore, in some aspects, the PRACH mask configuration may be jointly configured with a PUSCH occasion mask in a two-step random access procedure.

In some aspects, in cases where RO bundling is applied, the information element corresponding to the PRACH mask configuration may include one or more fields related to the RO bundling configuration. For example, in some aspects, the one or more fields related to the RO bundling configuration may include the size of an RO bundle and the total number of RO bundles per SSB beam. In some aspects, the size of the RO bundle may generally have a value of $2^x$ to be consecutive or continuous in the time domain. Additionally, in some aspects, the one or more fields related to the RO bundling configuration may include a bitmap that indicates an RO bundle pattern to be used by the UE to transmit a random access message on a beam associated with an SSB, where each bit of the bitmap may indicate whether the UE is allowed to transmit the random access message to initiate the random access procedure using one or more ROs in a corresponding RO bundle.

As further shown in FIG. 5A, and by reference number 530, the UE may transmit a random access message in an allowed RO based at least in part on the PRACH mask configuration provided by the base station. For example, as described above, the PRACH mask configuration may include a bit width for a PRACH mask index, and different SSB beams may be configured with different RO masking patterns. Accordingly, the base station may provide, to the UE, the bit width for a PRACH mask index and a value that the UE is to use for the PRACH mask index, which the UE may use to map the PRACH mask index value to a corresponding RO masking pattern that defines ROs in which the UE is allowed to transmit the random access message. Additionally, or alternatively, in some cases, the PRACH mask configuration provided to the UE may include RO bundling information, such as an RO bundle size, a total number of RO bundles per SSB beam, a bitmap to define the RO bundle pattern for ROs mapped to the same SSB beam, and/or the like. In this case, each bit of the bitmap may indicate whether the UE is allowed to transmit the random access message to initiate the random access procedure using one or more ROs in a corresponding RO bundle.

For example, as shown in FIG. 5B, reference number 540 illustrates an example of PRACH mask index having a scaled bit width without RO bundling. In the illustrated example, different SSB beams (e.g., SSB beam 1, SSB beam 2, and/or the like) may be configured with respective RO densities, and the different SSB beams may be configured with different RO grouping patterns. Accordingly, when the base station indicates the bit width for the PRACH mask index to the UE and a value of the PRACH mask index to be used by the UE, the bit width for the PRACH mask index may define the appropriate table that the UE is to use to determine a mapping between the value of the PRACH mask index and an RO masking pattern that the UE is to use to transmit the random access message on a beam associated with a particular SSB. Furthermore, as described above, the RO masking pattern includes one or more ROs in which the UE is allowed to transmit the random access message (e.g., msgA, msg1, and/or the like) to initiate the random access procedure (e.g., every RO, every even RO, any RO in a first half of a system frame, and/or the like).

As further shown in FIG. 5B, reference number 550 illustrates an example of a PRACH mask index having a scaled bit width with RO bundling. In this case, the PRACH mask configuration signaled to the UE may include a bundle size, a total number of RO bundles per SSB beam, and a bitmap to define the RO bundle pattern for ROs mapped to the same SSB beam, where each bit of the bitmap indicates whether the UE is allowed to transmit the random access message to initiate the random access procedure using one or more ROs in a corresponding RO bundle. For example, in FIG. 5B, the bundle size may be two, to indicate that an RO bundle includes two ROs, and the total number of RO bundles is two per SSB beam. In general, to ensure that the ROs in an RO bundle are continuous in time and frequency, the bundle size may be a power of two (e.g., $2^x$), whereby the bundle size may have a value of 1, 2, 4, 8, 16, and/or the like. Accordingly, if the bitmap indicates that UE is allowed to transmit the random access message to initiate the random access procedure using one or more RO bundles, the UE may transmit the random access message in any of the $2^x$ ROs that are included in the one or more RO bundles.

As indicated above, FIGS. 5A-5B are provided as one or more examples. Other examples may differ from what is described with respect to FIGS. 5A-5B.

Figure 6A:
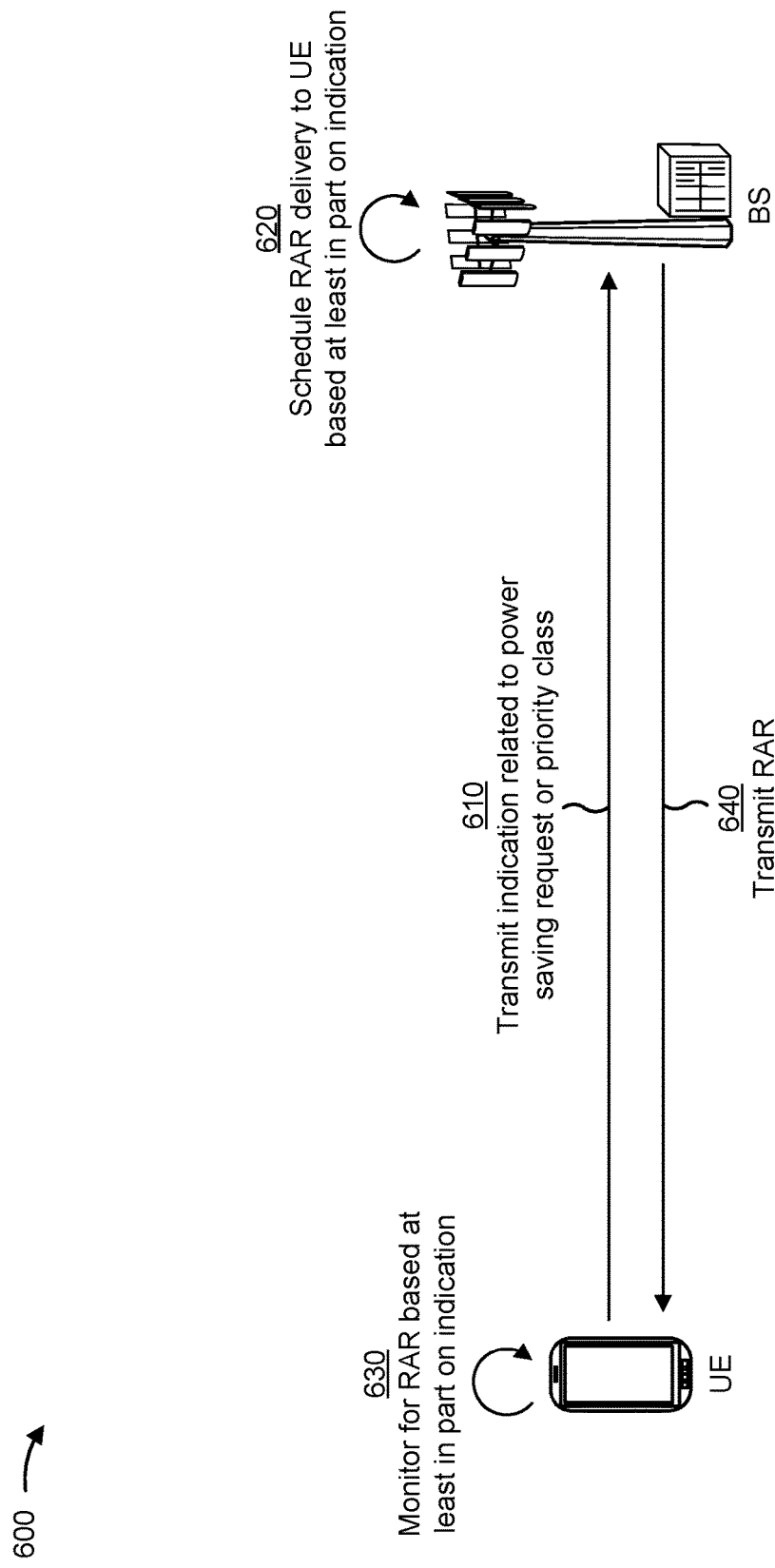
FIGS. 6A-6B are diagrams illustrating one or more examples providing an enhanced configuration for a random access response (RAR) window, in accordance with various aspects of the present disclosure.
Figure 6B:
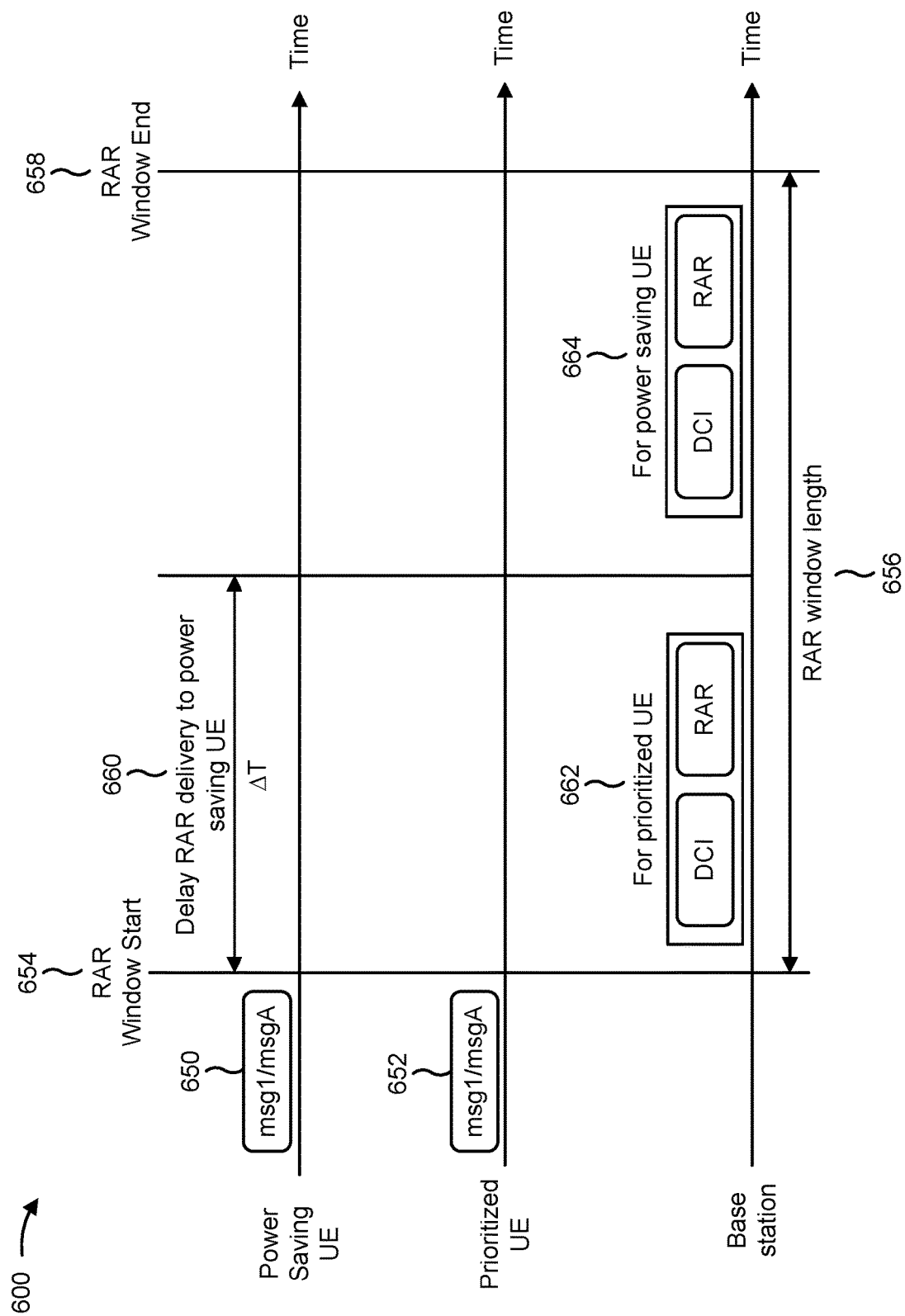

FIGS. 6A-6B are diagrams illustrating one or more examples 600 of providing an enhanced configuration for a random access response (RAR) window, in accordance with various aspects of the present disclosure. As shown in FIG. 6A, a base station and a UE may communicate with one another to perform a random access procedure based at least in part on the enhanced configuration for the RAR window. In general, the RAR window may generally refer to a time period during which the UE is to monitor one or more downlink channels for an RAR transmission after transmitting an initial message in a random access procedure. Accordingly, as described in further detail herein, the enhanced configuration for the RAR window may be used to enable the UE to defer monitoring a PDCCH for a RAR transmission, to scale an interval in which the UE monitors the PDCCH for the RAR transmission, and/or the like.

For example, in a two-step random access procedure, a starting point of the RAR window may be aligned with a first PDCCH symbol in an earliest search space configured for msgB, which is transmitted at least one symbol after the msgA payload (e.g., PUSCH) transmission. In a four-step RACH procedure, a starting point of the RAR window may be aligned with a first PDCCH symbol in an earliest search space configured for msg2, which is transmitted from the base station to the UE at least one symbol after the msg1 preamble transmission from the UE to the base station. Furthermore, the RAR window may have a length or duration that is indicated to the UE in system information, RRC signaling, and/or the like.

As shown in FIG. 6A, and by reference number 610, the UE may transmit, and the base station may receive, an indication related to a power saving request by the UE and/or a priority class associated with the UE. For example, in some aspects, the base station may initially configure multiple PRACH masks, multiple random access preamble groups on shared ROs, multiple DMRS resource mapping patterns, multiple PUSCH occasion configurations, and/or the like to support UEs with different power saving requests and/or different priority classes. Accordingly, in some aspects, the base station may provide, to the UE, information related to the multiple PRACH masks, multiple random access preamble groups on shared ROs, multiple DMRS resource mapping patterns, multiple PUSCH occasion configurations, and/or the like that are configured for the base station, and the UE may select one of the multiple options (e.g., a particular PRACH mask, random access preamble group, DMRS resource mapping pattern, PUSCH occasion configuration, and/or the like) to implicitly indicate the power saving request and/or priority class of the UE when transmitting an initial message in a random access procedure (e.g., msg1 in a four-step random access procedure or msgA in a two-step random access procedure). In general, to provide more (or less) granularity in indicating the power saving request and/or priority class, the base station may configure more (or fewer) options for the multiple PRACH masks, multiple random access preamble groups on shared ROs, multiple DMRS resource mapping patterns, multiple PUSCH occasion configurations, and/or the like. Additionally, or alternatively, in some aspects, the UE may explicitly indicate the power saving request and/or priority class of the UE, with the explicit indicator piggybacked onto uplink control information, a payload of the random access message, and/or the like.

As further shown in FIG. 6A, and by reference number 620, the base station may schedule delivery of an RAR to the UE based at least in part on the indication received from the UE. In some aspects, the base station may configure different power control parameters, HARQ and link adaptation procedures, and/or the like to support different UE capabilities, different random access types, different priority classes, and/or the like, which may be determined according to the indication received from the UE. For example, in cases where the indication received from the UE includes a power saving request, the base station may add a time offset (ΔT) to a starting point of the RAR window, and the base station may schedule transmission of the RAR to the UE in a portion of the RAR window after the time offset has elapsed. In some aspects, the time offset may be defined at a slot level (e.g., as a quantity of slots), at a radio frame level (e.g., as X radio frames, where X can be 0.25, 0.5, 1, and/or the like), as a fraction of the RAR window length, and/or the like.

Additionally, or alternatively, in cases where the indication received from the UE is a prioritized request (e.g., when the UE is initiating the random access procedure in a handover scenario, a beam failure recovery scenario, and/or the like), the base station may use one or more techniques to schedule delivery of the RAR to the UE. For example, in some aspects, the base station may prioritize a first RAR transmission occasion and/or RAR retransmission occasion in a time and frequency resource allocation for the UE that indicated the priority request. Additionally, or alternatively, the base station may reduce a number of multiplexed MAC sub-PDUs to increase reliability of the RAR transmission to the UE. For example, in some cases, the RAR transmission may typically be scheduled as a multicast message to multiple UEs, and the number of multiplexed sub-PDUs for the multicast message may be reduced when the RAR transmission is prioritized (e.g., from four sub-PDUs to two sub-PDUs). In another technique, the base station may increase a number of RAR retransmissions that are scheduled within the RAR window and blindly performed for the UE that indicated the priority request to increase reliability of the RAR delivery. In another technique, the base station may schedule a more reliable transport format (e.g., a lower modulation coding scheme (MCS), a lower coding rate, and/or the like), a different set of power control parameters (e.g., a higher transmit power, an increased power ramping, and/or the like), and/or the like for a subsequent uplink transmission by the UE following the initial message of the random access procedure.

As further shown in FIG. 6A, and by reference number 630, the UE may monitor for the RAR transmission based at least in part on the indication provided to the base station. For example, in cases where the indication includes a power saving request, the time offset to be added to the starting point of the regular RAR window may be configured by the base station and indicated to the UE. Accordingly, when the UE provides the (implicit or explicit) indication of the power saving request, the UE may know the time offset to be applied, whereby the UE may refrain from monitoring for the RAR transmission after transmitting the initial random access message (e.g., msg1 in a four-step random access procedure, or the msgA payload in a two-step random access procedure) until the time offset has elapsed. Alternatively, in cases where the indication includes a prioritization request, the UE may monitor for the RAR transmission after transmitting the initial random access message. For example, the base station may use the initial period of the RAR window during which delivery is delayed to power saving UEs to deliver the RAR to prioritized UEs and thereby efficiently use time and frequency resources during the entire RAR window.

As further shown in FIG. 6A, and by reference number 640, the base station may transmit the RAR to the UE based at least in part on the indication related to the power saving request and/or priority class. For example, in cases where the indication includes a power saving request, the base station may delay delivery of the RAR to the UE until the time offset added to the starting point of the regular RAR window has elapsed. Accordingly, in some aspects, the base station may transmit the RAR to the UE after the configured time offset has elapsed when the indication received from the UE includes a power saving request. Alternatively, in cases where the indication includes a prioritization request, the base station may transmit the RAR to the UE during the initial period of the RAR window in which delivery is delayed to power saving UEs. Furthermore, in some aspects, the base station may transmit the RAR to the UE using one or more of the prioritization techniques described above (e.g., prioritizing a first RAR transmission occasion and/or RAR retransmission occasion in a time and frequency resource allocation for the UE that indicated the priority request, reducing a number of multiplexed MAC sub-PDUs, increasing a number of RAR retransmissions that are blindly performed within the RAR window, and/or the like). Additionally, or alternatively, in some aspects, when the base station transmits the RAR to the UE that indicated the prioritization request, the base station may configure the UE to use a more reliable transport format (e.g., a lower MCS, a lower coding rate, and/or the like), a higher transmit power, an increased power ramping, and/or the like for a subsequent uplink transmission by the UE.

As further shown in FIG. 6B, and by reference number 660, the base station may delay delivery of an RAR to the power saving UE for the time offset ΔT based on the power saving request received from the power saving UE. Accordingly, during the period of the time offset from the RAR window start time, the power saving UE may refrain from monitoring for the RAR transmission and may enter a power saving mode. Furthermore, as shown by reference number 662, the base station may schedule delivery of the RAR to the prioritized UE during the period of the time offset from the RAR window start time. In some aspects, the base station may further apply one or more of the techniques described above when transmitting the RAR to the prioritized UE (e.g., prioritizing a first RAR transmission occasion and/or RAR retransmission occasion of RAR in a time and frequency resource allocation, reducing a number of multiplexed MAC sub-PDUs, increasing a number of blind RAR retransmissions within the RAR window, configuring a more reliable transport format and/or a different set of power control parameters for a subsequent uplink transmission by the prioritized UE, and/or the like). As further shown by reference number 664, the base station may subsequently transmit the RAR to the power saving UE after the time offset has elapsed. In this way, the base station may efficiently stagger RAR transmissions to different UEs based on different power saving requests, priority classes, and/or the like.

As indicated above, FIGS. 6A-6B are provided as one or more examples. Other examples may differ from what is described with respect to FIGS. 6A-6B.

Figure 7:
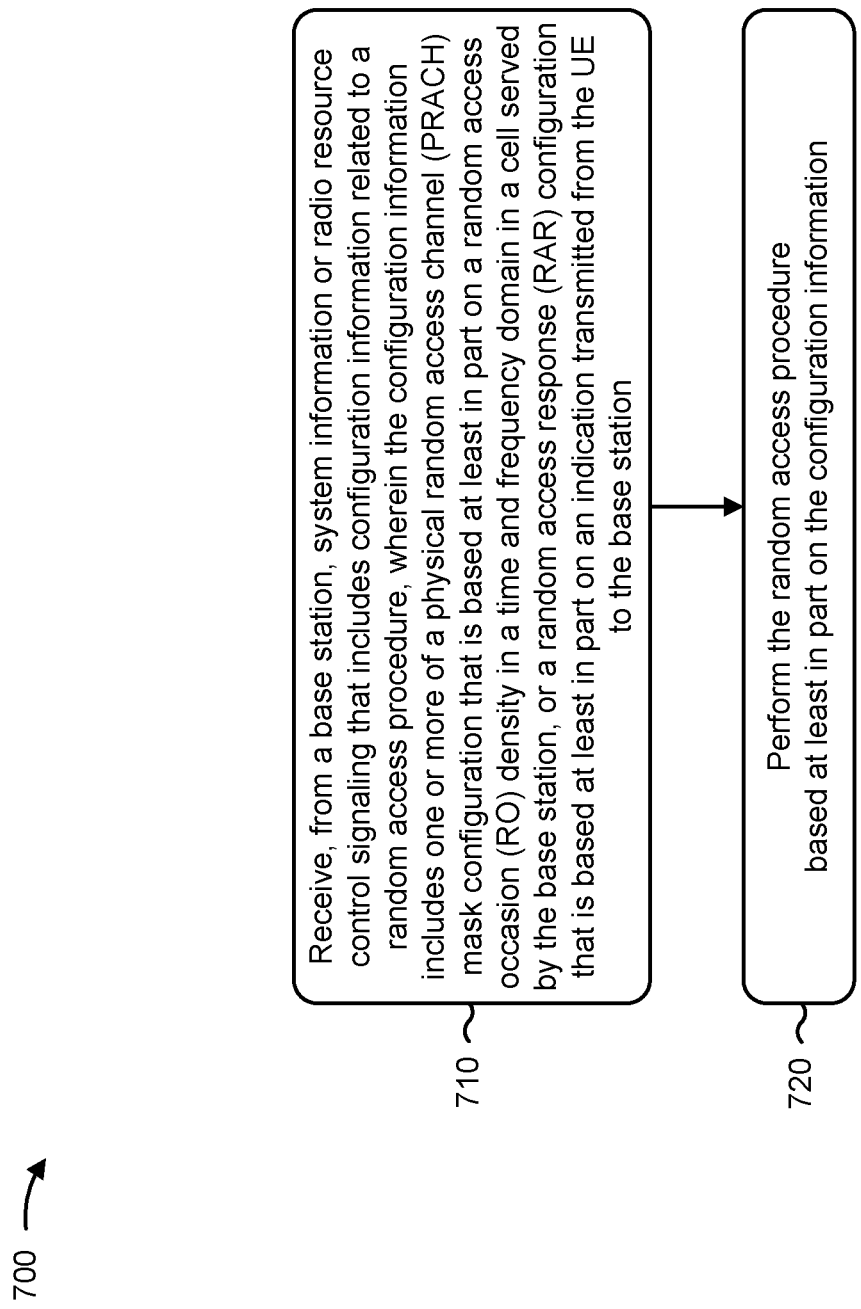
FIGS. 7-8 are diagrams illustrating example processes related to providing an enhanced configuration for a PRACH mask and/or RAR window, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations related to an enhanced configuration for a PRACH mask and RAR window.

As shown in FIG. 7, in some aspects, process 700 may include receiving, from a base station, system information or radio resource control signaling that includes configuration information related to a random access procedure, wherein the configuration information includes one or more of a PRACH mask configuration that is based at least in part on an RO density in a time and frequency domain in a cell served by the base station, or an RAR configuration that is based at least in part on an indication transmitted from the UE to the base station (block 710). For example, the UE may receive (e.g., using antenna 252, DEMOD 254, MIMO detector 256, receive processor 258, controller/processor 280, and/or the like), from a base station, system information or radio resource control signaling that includes configuration information related to a random access procedure, as described above. In some aspects, the configuration information includes one or more of a PRACH mask configuration that is based at least in part on an RO density in a time and frequency domain in a cell served by the base station, or an RAR configuration that is based at least in part on an indication transmitted from the UE to the base station.

As further shown in FIG. 7, in some aspects, process 700 may include performing the random access procedure based at least in part on the configuration information (block 720). For example, the UE may perform (e.g., using antenna 252, DEMOD 254, MIMO detector 256, receive processor 258, transmit processor 264, TX MIMO processor 266, MOD 254, controller/processor 280, and/or the like) the random access procedure based at least in part on the configuration information, as described above.

Process 700 may include additional aspects, such as any single aspect or any combination of aspects described below and/or in connection with one or more other processes described elsewhere herein.

In a first aspect, the configuration information includes the PRACH mask configuration that is based at least in part on the RO density in the time and frequency domain in the cell served by the base station.

In a second aspect, alone or in combination with the first aspect, the PRACH mask configuration indicates a bit width for a PRACH mask index to be used in the cell and one or more values of the PRACH mask index to be used by the UE, and wherein one or more of the bit width or the one or more values of the PRACH mask index is based at least in part on the RO density in the time and frequency domain.

In a third aspect, alone or in combination with one or more of the first and second aspects, the bit width indicates a mapping range and granularity between the one or more values of the PRACH mask index and an RO masking pattern, for an SSB, to be used by the UE to transmit a random access message on a beam associated with the SSB, and the RO masking pattern includes one or more ROs in which the UE is allowed to transmit the random access message to initiate the random access procedure.

In a fourth aspect, alone or in combination with one or more of the first through third aspects, different bit widths correspond to different mapping ranges and granularities between PRACH mask index values and corresponding RO masking patterns, and different SSBs can be associated with different PRACH mask indexes.

In a fifth aspect, alone or in combination with one or more of the first through fourth aspects, the PRACH mask configuration indicates one or more values of a PRACH mask index to be used by the UE, the one or more values correspond to a bitmap that indicates an RO bundle pattern, for an SSB, to be used by the UE to transmit a random access message on a beam associated with the SSB, the RO bundle pattern includes one or more ROs consecutive in time or frequency in which the UE is allowed to transmit the random access message to initiate the random access procedure, and different SSBs can be associated with different PRACH mask configurations.

In a sixth aspect, alone or in combination with one or more of the first through fifth aspects, the PRACH mask configuration indicates one or more values of a PRACH mask index, a size of an RO bundle associated with the PRACH mask index, and a number of RO bundles associated with the PRACH mask index, and the size of the RO bundle indicates a number of ROs included in each RO bundle.

In a seventh aspect, alone or in combination with one or more of the first through sixth aspects, the one or more values of the PRACH mask index correspond to a bitmap that indicates an RO bundle pattern, for an SSB, to be used by the UE to transmit a random access message on a beam associated with the SSB, and each bit of the bitmap indicates whether the UE is allowed to transmit the random access message to initiate the random access procedure using one or more ROs in a corresponding RO bundle.

In an eighth aspect, alone or in combination with one or more of the first through seventh aspects, the PRACH mask configuration is specific to a bandwidth part, and the PRACH mask can be jointly configured with a PUSCH occasion mask in a two-step random access procedure.

In a ninth aspect, alone or in combination with one or more of the first through eighth aspects, the configuration information includes the RAR configuration that is based at least in part on the indication transmitted from the UE to the base station.

In a tenth aspect, alone or in combination with one or more of the first through ninth aspects, the indication includes at least one of a power saving request by the UE or a priority class associated with the random access procedure of the UE.

In an eleventh aspect, alone or in combination with one or more of the first through tenth aspects, the configuration information indicates multiple sets of transmission parameters associated with the random access procedure, and each set of transmission parameters corresponds to a different power saving request or a different priority class.

In a twelfth aspect, alone or in combination with one or more of the first through eleventh aspects, at least one of the power saving request or the priority class is indicated based at least in part on a set of uplink transmission parameters, of the multiple sets of transmission parameters, selected by the UE for transmission of a random access message.

In a thirteenth aspect, alone or in combination with one or more of the first through twelfth aspects, the set of uplink transmission parameters includes at least one of a PRACH mask index, a random access preamble, a DMRS resource pattern, or a PUSCH occasion configuration.

In a fourteenth aspect, alone or in combination with one or more of the first through thirteenth aspects, at least one of the power saving request or the priority class is indicated in UCI or a payload of a random access message transmitted by the UE.

In a fifteenth aspect, alone or in combination with one or more of the first through fourteenth aspects, process 700 further includes selectively monitoring for the RAR in a configured time window after transmission of a random access message based at least in part on the power saving request or the priority class. In some aspects, selectively monitoring for the RAR includes deferring monitoring of a PDCCH by a time offset In a sixteenth aspect, alone or in combination with one or more of the first through fifteenth aspects, at least one of a transport format used for downlink transmission of the RAR or a power control parameter for a subsequent uplink transmission by the UE is based at least in part on the power saving request or the priority class.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
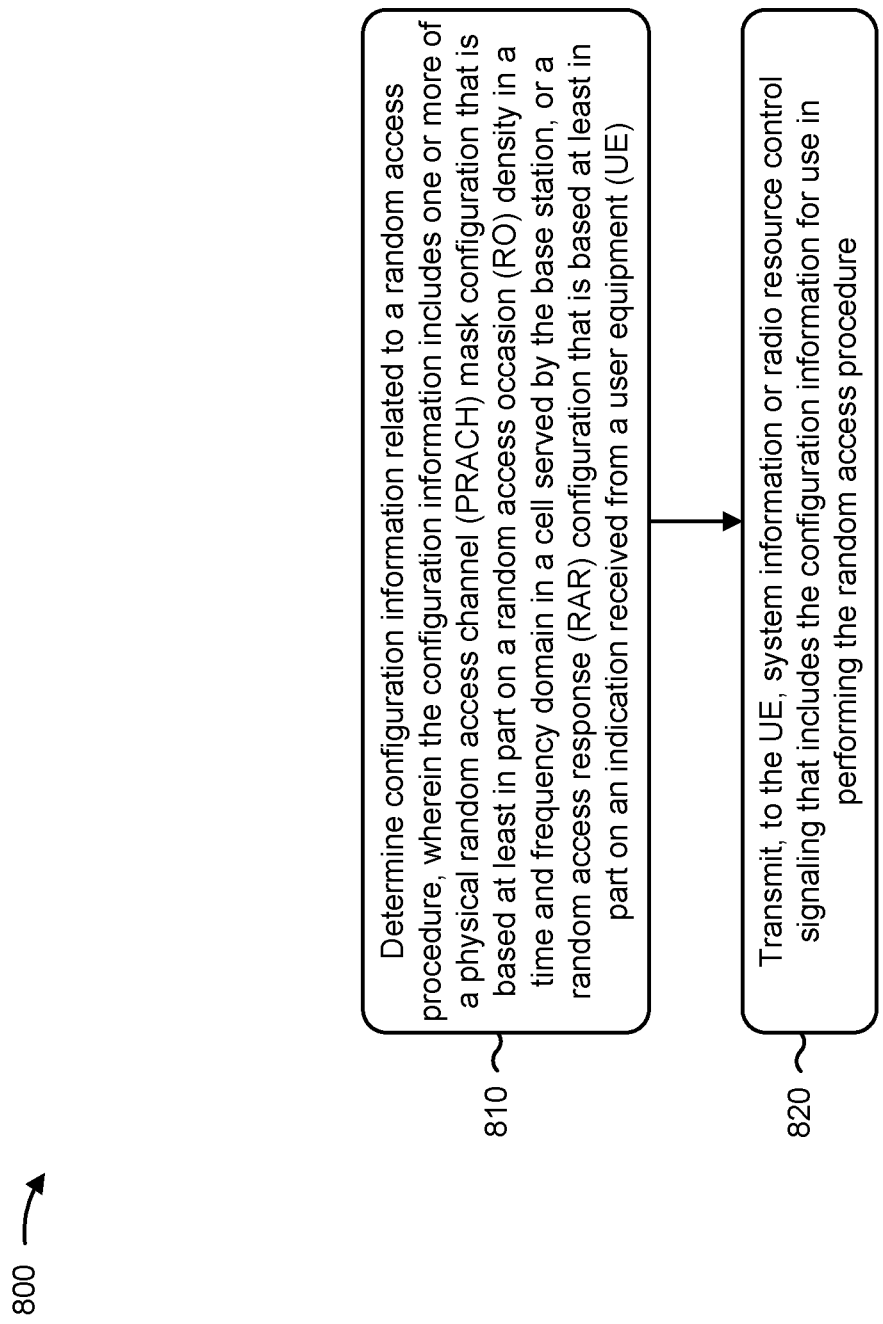

FIG. 8 is a diagram illustrating an example process 800 performed, for example, by a base station, in accordance with various aspects of the present disclosure. Example process 800 is an example where a base station (e.g., base station 120 and/or the like) performs operations related to an enhanced configuration for a PRACH mask and RAR window.

As shown in FIG. 8, in some aspects, process 800 may include determining configuration information related to a random access procedure, wherein the configuration information includes one or more of a PRACH mask configuration that is based at least in part on an RO density in a time and frequency domain in a cell served by the base station, or an RAR configuration that is based at least in part on an indication received from a UE (block 810). For example, the base station may determine (e.g., using controller/processor 240 and/or the like) configuration information related to a random access procedure, as described above. In some aspects, the configuration information includes one or more of a PRACH mask configuration that is based at least in part on an RO density in a time and frequency domain in a cell served by the base station, or an RAR configuration that is based at least in part on an indication received from a UE.

As further shown in FIG. 8, in some aspects, process 800 may include transmitting, to the UE, system information or RRC signaling that includes the configuration information for use in performing the random access procedure (block 820). For example, the base station may transmit (e.g., using controller/processor 240, transmit processor 220, TX MIMO processor 230, MOD 232, antenna 234, and/or the like), to the UE, system information or RRC signaling that includes the configuration information for use in performing the random access procedure, as described above.

Process 800 may include additional aspects, such as any single aspect or any combination of aspects described below and/or in connection with one or more other processes described elsewhere herein.

In a first aspect, the configuration information includes the PRACH mask configuration that is based at least in part on the RO density in the time and frequency domain in the cell served by the base station.

In a second aspect, alone or in combination with the first aspect, the PRACH mask configuration indicates a bit width for a PRACH mask index to be used in the cell and one or more values of the PRACH mask index to be used by the UE, and one or more of the bit width or the one or more values of the PRACH mask index is based at least in part on the RO density.

In a third aspect, alone or in combination with one or more of the first and second aspects, the bit width indicates a mapping range and granularity between the one or more values of the PRACH mask index and an RO masking pattern, for an SSB, to be used by the UE to transmit a random access message on a beam associated with the SSB, and the RO masking pattern includes one or more ROs in which the UE is allowed to transmit the random access message to initiate the random access procedure.

In a fourth aspect, alone or in combination with one or more of the first through third aspects, different bit widths correspond to different mapping ranges and granularities between PRACH mask index values and corresponding RO masking patterns, and different SSBs can be associated with different PRACH mask indexes.

In a fifth aspect, alone or in combination with one or more of the first through fourth aspects, the PRACH mask configuration indicates one or more values of a PRACH mask index to be used by the UE, the one or more values correspond to a bitmap that indicates an RO bundle pattern, for an SSB, to be used by the UE to transmit a random access message on a beam associated with the SSB, the RO bundle pattern includes one or more ROs consecutive in time or frequency in which the UE is allowed to transmit the random access message to initiate the random access procedure, and different SSBs can be associated with different PRACH mask configurations.

In a sixth aspect, alone or in combination with one or more of the first through fifth aspects, the PRACH mask configuration indicates one or more values of a PRACH mask index, a size of an RO bundle associated with the PRACH mask index, and a number of RO bundles associated with the PRACH mask index, and the size of the RO bundle indicates a number of ROs included in each RO bundle.

In a seventh aspect, alone or in combination with one or more of the first through sixth aspects, the value of the PRACH mask index corresponds to a bitmap that indicates an RO bundle pattern, for an SSB, to be used by the UE to transmit a random access message on a beam associated with the SSB, and each bit of the bitmap indicates whether the UE is allowed to transmit the random access message to initiate the random access procedure using one or more ROs in a corresponding RO bundle.

In an eighth aspect, alone or in combination with one or more of the first through seventh aspects, the PRACH mask configuration is specific to a bandwidth part, and the PRACH mask can be jointly configured with a physical uplink shared channel occasion mask in a two-step random access procedure.

In a ninth aspect, alone or in combination with one or more of the first through eighth aspects, the configuration information includes the RAR configuration that is based at least in part on the indication transmitted from the UE to the base station.

In a tenth aspect, alone or in combination with one or more of the first through ninth aspects, the indication includes at least one of a power saving request by the UE or a priority class associated with the random access procedure of the UE.

In an eleventh aspect, alone or in combination with one or more of the first through tenth aspects, the configuration information indicates multiple sets of transmission parameters associated with the random access procedure, and each set of transmission parameters corresponds to a different power saving request or a different priority class.

In a twelfth aspect, alone or in combination with one or more of the first through eleventh aspects, at least one of the power saving request or the priority class is indicated based at least in part on a set of uplink transmission parameters, of the multiple sets of transmission parameters, selected by the UE for transmission of a random access message.

In a thirteenth aspect, alone or in combination with one or more of the first through twelfth aspects, the set of uplink transmission parameters includes at least one of a PRACH mask index, a random access preamble, a DMRS resource pattern, or a PUSCH occasion configuration.

In a fourteenth aspect, alone or in combination with one or more of the first through thirteenth aspects, at least one of the power saving request or the priority class is indicated in UCI information or a payload of a random access message transmitted by the UE.

In a fifteenth aspect, alone or in combination with one or more of the first through fourteenth aspects, process 800 further includes transmitting the RAR in a configured time window after transmission of a random access message based at least in part on the power saving request or the priority class.

In a sixteenth aspect, alone or in combination with one or more of the first through fifteenth aspects, at least one of a transport format used for downlink transmission of the RAR or a power control parameter for a subsequent uplink transmission by the UE is based at least in part on the power saving request or the priority class.

In a seventeenth aspect, alone or in combination with one or more of the first through sixteenth aspects, the RAR configuration includes at least one of a resource for transmitting or retransmitting an RAR, a number of RAR messages multiplexed with the RAR in a medium access control protocol data unit, or a number of repetitions of the RAR within an RAR window based at least in part on a power saving request or a priority class provided in the indication received from the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors operatively coupled to the one or more memories and configured, individually or collectively, to cause the UE to:
      receive, from a network entity, system information or radio resource control signaling that includes configuration information related to a random access procedure, wherein the configuration information includes a physical random access channel (PRACH) mask configuration that is based at least in part on a random access occasion (RO) density in a time and frequency domain in a cell served by the network entity; and perform the random access procedure based at least in part on the configuration information.

2. The UE of claim 1, wherein the PRACH mask configuration indicates a bit width for a PRACH mask index to be used in the cell and one or more values of the PRACH mask index to be used by the UE, and wherein one or more of the bit width or the one or more values of the PRACH mask index is based at least in part on the RO density in the time and frequency domain.

3. The UE of claim 2, wherein the bit width indicates a mapping range and granularity between the one or more values of the PRACH mask index and an RO masking pattern, for a synchronization signal block (SSB), to be used by the UE to transmit a random access message on a beam associated with the SSB, and wherein the RO masking pattern includes one or more ROs in which the UE is allowed to transmit the random access message to initiate the random access procedure.

4. The UE of claim 3, wherein different bit widths correspond to different mapping ranges and granularities between PRACH mask index values and corresponding RO masking patterns, and wherein different SSBs can be associated with different PRACH mask indexes.

5. The UE of claim 1, wherein the PRACH mask configuration indicates one or more values of a PRACH mask index to be used by the UE, wherein the one or more values correspond to a bitmap that indicates an RO bundle pattern, for a synchronization signal block (SSB), to be used by the UE to transmit a random access message on a beam associated with the SSB, wherein the RO bundle pattern includes one or more ROs consecutive in time or frequency in which the UE is allowed to transmit the random access message to initiate the random access procedure, and wherein different SSBs can be associated with different PRACH mask configurations.

6. The UE of claim 1, wherein the PRACH mask configuration indicates one or more values of a PRACH mask index, a size of an RO bundle associated with the PRACH mask index, and a number of RO bundles associated with the PRACH mask index, and wherein the size of the RO bundle indicates a number of ROs included in each RO bundle.

7. The UE of claim 6, wherein the one or more values of the PRACH mask index correspond to a bitmap that indicates an RO bundle pattern, for a synchronization signal block (SSB), to be used by the UE to transmit a random access message on a beam associated with the SSB, and wherein each bit of the bitmap indicates whether the UE is allowed to transmit the random access message to initiate the random access procedure using one or more ROs in a corresponding RO bundle.

8. The UE of claim 1, wherein the PRACH mask configuration is specific to a bandwidth part, and the PRACH mask can be jointly configured with a physical uplink shared channel occasion mask in a two-step random access procedure.

9. A user equipment (UE) for wireless communication, comprising:
one or more memories; and
one or more processors operatively coupled to the one or more memories and configured, individually or collectively, to cause the UE to:
transmit an indication to a network entity, wherein the indication includes at least one of a power saving request by the UE or a priority class associated with a random access procedure of the UE;
receive, from the network entity, system information or radio resource control signaling that includes configuration information related to the random access procedure, wherein the configuration information includes a random access response (RAR) configuration that is based at least in part on the indication transmitted from the UE to the network entity; and
perform the random access procedure based at least in part on the configuration information.

10. The UE of claim 9, wherein the configuration information indicates multiple sets of transmission parameters associated with the random access procedure, and wherein each set of transmission parameters corresponds to a different power saving request or a different priority class.

11. The UE of claim 10, wherein at least one of the power saving request or the priority class is indicated based at least in part on a set of uplink transmission parameters, of the multiple sets of transmission parameters, selected by the UE for transmission of a random access message.

12. The UE of claim 9, wherein at least one of the power saving request or the priority class is indicated in uplink control information or a payload of a random access message transmitted by the UE.

13. The UE of claim 9, wherein the one or more processors are configured, individually or collectively, to cause the UE to selectively monitor for the RAR in a configured time window after transmission of a random access message based at least in part on the power saving request or the priority class, wherein the one or more processors are configured, individually or collectively, to cause the UE to defer monitoring of a physical downlink control channel (PDCCH) by a time offset.

14. The UE of claim 9, wherein at least one of a transport format used for downlink transmission of the RAR or a power control parameter for a subsequent uplink transmission by the UE is based at least in part on the power saving request or the priority class.

15. A network entity for wireless communication, comprising:
one or more memories; and
one or more processors operatively coupled to the one or more memories and configured, individually or collectively, to cause the network entity to:
determine configuration information related to a random access procedure, wherein the configuration information includes one or more of a physical random access channel (PRACH) mask configuration that is based at least in part on a random access occasion (RO) density in a time and frequency domain in a cell served by the network entity; and
transmit, to a user equipment (UE) system information or radio resource control signaling that includes the configuration information for use in performing the random access procedure.

16. The network entity of claim 15, wherein the PRACH mask configuration indicates a bit width for a PRACH mask index to be used in the cell and one or more values of the PRACH mask index to be used by the UE, and wherein one or more of the bit width or the one or more values of the PRACH mask index is based at least in part on the RO density in the time and frequency domain.

17. The network entity of claim 16, wherein the bit width indicates a mapping range and granularity between the one or more values of the PRACH mask index and an RO masking pattern, for a synchronization signal block (SSB), to be used by the UE to transmit a random access message on a beam associated with the SSB, and wherein the RO masking pattern includes one or more ROs in which the UE is allowed to transmit the random access message to initiate the random access procedure.

18. The network entity of claim 17, wherein different bit widths correspond to different mapping ranges and granularities between PRACH mask index values and corresponding RO masking patterns, and wherein different SSBs can be associated with different PRACH mask indexes.

19. The network entity of claim 15, wherein the PRACH mask configuration indicates one or more values of a PRACH mask index to be used by the UE, wherein the one or more values correspond to a bitmap that indicates an RO bundle pattern, for a synchronization signal block (SSB), to be used by the UE to transmit a random access message on a beam associated with the SSB, wherein the RO bundle pattern includes one or more ROs consecutive in time or frequency in which the UE is allowed to transmit the random access message to initiate the random access procedure, and wherein different SSBs can be associated with different PRACH mask configurations.

20. The network entity of claim 15, wherein the PRACH mask configuration indicates one or more values of a PRACH mask index, a size of an RO bundle associated with the PRACH mask index, and a number of RO bundles associated with the PRACH mask index, and wherein the size of the RO bundle indicates a number of ROs included in each RO bundle.

21. The network entity of claim 20, wherein the one or more values of the PRACH mask index correspond to a bitmap that indicates an RO bundle pattern, for a synchronization signal block (SSB), to be used by the UE to transmit a random access message on a beam associated with the SSB, and wherein each bit of the bitmap indicates whether the UE is allowed to transmit the random access message to initiate the random access procedure using one or more ROs in a corresponding RO bundle.

22. The network entity of claim 15, wherein the PRACH mask configuration is specific to a bandwidth part, and the PRACH mask can be jointly configured with a physical uplink shared channel occasion mask in a two-step random access procedure.

23. A network entity for wireless communication, comprising:
one or more memories; and
one or more processors operatively coupled to the one or more memories and configured, individually or collectively, to cause the network entity to:
receive an indication from a user equipment (UE), wherein the indication includes at least one of a power saving request by the UE or a priority class associated with a random access procedure of the UE;
determine configuration information related to a random access procedure, wherein the configuration information includes a random access response (RAR) configuration that is based at least in part on the indication received from the UE; and
transmit, to the UE, system information or radio resource control signaling that includes the configuration information for use in performing the random access procedure.

24. The network entity of claim 23, wherein the configuration information indicates multiple sets of transmission parameters associated with the random access procedure, and wherein each set of transmission parameters corresponds to a different power saving request or a different priority class.

25. The network entity of claim 24, wherein at least one of the power saving request or the priority class is indicated based at least in part on a set of uplink transmission parameters, of the multiple sets of transmission parameters, selected by the UE for transmission of a random access message.

26. The network entity of claim 23, wherein at least one of the power saving request or the priority class is indicated in uplink control information or a payload of a random access message transmitted by the UE.

27. The network entity of claim 23, wherein the one or more processors are configured, individually or collectively, to cause the network entity to transmit the RAR in a configured time window after transmission of a random access message based at least in part on the power saving request or the priority class.

28. The network entity of claim 23, wherein at least one of a transport format used for downlink transmission of the RAR or a power control parameter for a subsequent uplink transmission by the UE is based at least in part on the power saving request or the priority class.

29. The network entity of claim 23, wherein the RAR configuration includes at least one of a resource for transmitting or retransmitting an RAR, a number of RAR messages multiplexed with the RAR in a medium access control protocol data unit, or a number of repetitions of the RAR within an RAR window based at least in part on a power saving request or a priority class provided in the indication received from the UE.

30. A method of wireless communication performed by a user equipment, comprising:
receiving, from a network entity, system information or radio resource control signaling that includes configuration information related to a random access procedure, wherein the configuration information includes one or more of a physical random access channel mask configuration that is based at least in part on a random access occasion density in a time and frequency domain in a cell served by the network entity; and
performing the random access procedure based at least in part on the configuration information.

31. A method of wireless communication performed by a network entity, comprising:
determining configuration information related to a random access procedure, wherein the configuration information includes one or more of a physical random access channel mask configuration that is based at least in part on a random access occasion density in a time and frequency domain in a cell served by the network entity; and
transmitting, to a user equipment (UE), system information or radio resource control signaling that includes the configuration information for use in performing the random access procedure.

* * * * *